United States Patent
Yamashita

(10) Patent No.: US 12,518,361 B2
(45) Date of Patent: Jan. 6, 2026

(54) IMAGE CAPTURE APPARATUS AND CONTROL METHOD FOR CORRECTING LENS DISTORTION

(71) Applicant: CANON KABUSHIKI KAISHA, Tokyo (JP)

(72) Inventor: Kouki Yamashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 18/153,605

(22) Filed: Jan. 12, 2023

(65) Prior Publication Data

US 2023/0230211 A1    Jul. 20, 2023

(30) Foreign Application Priority Data

Jan. 20, 2022   (JP) ................... 2022-007274

(51) Int. Cl.
| | |
|---|---|
| *G06T 5/80* | (2024.01) |
| *G06T 7/13* | (2017.01) |
| *G06T 7/20* | (2017.01) |
| *G06T 7/62* | (2017.01) |
| *G06V 10/74* | (2022.01) |

(52) U.S. Cl.
CPC ............... *G06T 5/80* (2024.01); *G06T 7/13* (2017.01); *G06T 7/20* (2013.01); *G06T 7/62* (2017.01); *G06V 10/761* (2022.01)

(58) Field of Classification Search
CPC .... G06T 5/80; G06T 7/13; G06T 7/20; G06T 7/62; G06T 7/80; G06T 7/70; G06T 7/97; G06V 10/761; H04N 23/64; H04N 23/631; H04N 17/002
See application file for complete search history.

(56) References Cited

U.S. PATENT DOCUMENTS

| | | | | |
|---|---|---|---|---|
| 5,305,029 A | * | 4/1994 | Yoshida | H04N 9/3185 |
| | | | | 353/31 |
| 8,681,224 B2 | | 3/2014 | Mallon et al. | |
| 2005/0036032 A1 | * | 2/2005 | Lee | H04N 17/002 |
| | | | | 348/188 |

(Continued)

FOREIGN PATENT DOCUMENTS

| | | | | |
|---|---|---|---|---|
| EP | 4216148 A2 | * | 7/2023 | ............. H04N 23/64 |
| EP | 4216545 A1 | * | 7/2023 | ............ H04N 17/002 |

(Continued)

*Primary Examiner* — Gandhi Thirugnanam
(74) *Attorney, Agent, or Firm* — Canon U.S.A., Inc. IP Division

(57) ABSTRACT

An image capture apparatus that captures an image of a chart for correcting distortion of a lens, obtains a deviation angle indicating an angle of deviation of the image capture apparatus from a directly facing positional relationship relative to the chart, obtains a deviation distance indicating a distance of deviation from the directly facing positional relationship, obtains an appropriate distance between the chart and the image capture apparatus in the directly facing positional relationship, and presents information based on the deviation angle and the deviation distance so that the directly facing positional relationship is established, and present information regarding the appropriate distance in a case in which the deviation distance and the deviation angle have each fallen below a predetermined determination threshold.

15 Claims, 9 Drawing Sheets

(56) References Cited

U.S. PATENT DOCUMENTS

| | | | |
|---|---|---|---|
| 2012/0075428 A1 | 3/2012 | Seki | |
| 2016/0360195 A1 | 12/2016 | Itoh et al. | |
| 2018/0038686 A1* | 2/2018 | Yamada | A61B 1/00172 |
| 2019/0287267 A1* | 9/2019 | Chen | G06T 5/80 |
| 2020/0273205 A1* | 8/2020 | Yamashita | H04N 17/002 |
| 2020/0374468 A1 | 11/2020 | Nobayashi et al. | |
| 2023/0230211 A1* | 7/2023 | Yamashita | G06T 7/13 |
| | | | 382/275 |
| 2023/0230282 A1* | 7/2023 | Asano | G06T 7/80 |
| | | | 348/187 |

FOREIGN PATENT DOCUMENTS

| | | | |
|---|---|---|---|
| JP | 2020193820 A | 12/2020 | |
| JP | 2021027584 A | 2/2021 | |
| WO | 2017179722 A1 | 10/2017 | |
| WO | 2020105499 A1 | 5/2020 | |

* cited by examiner

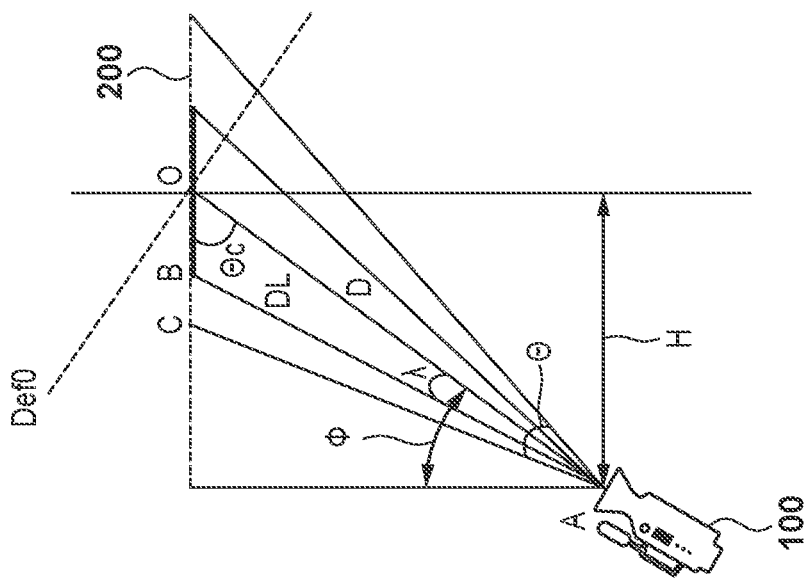
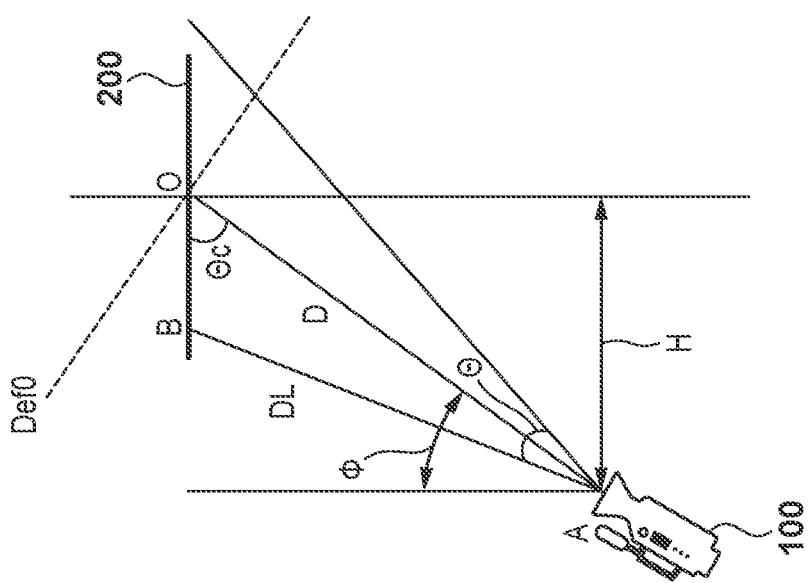

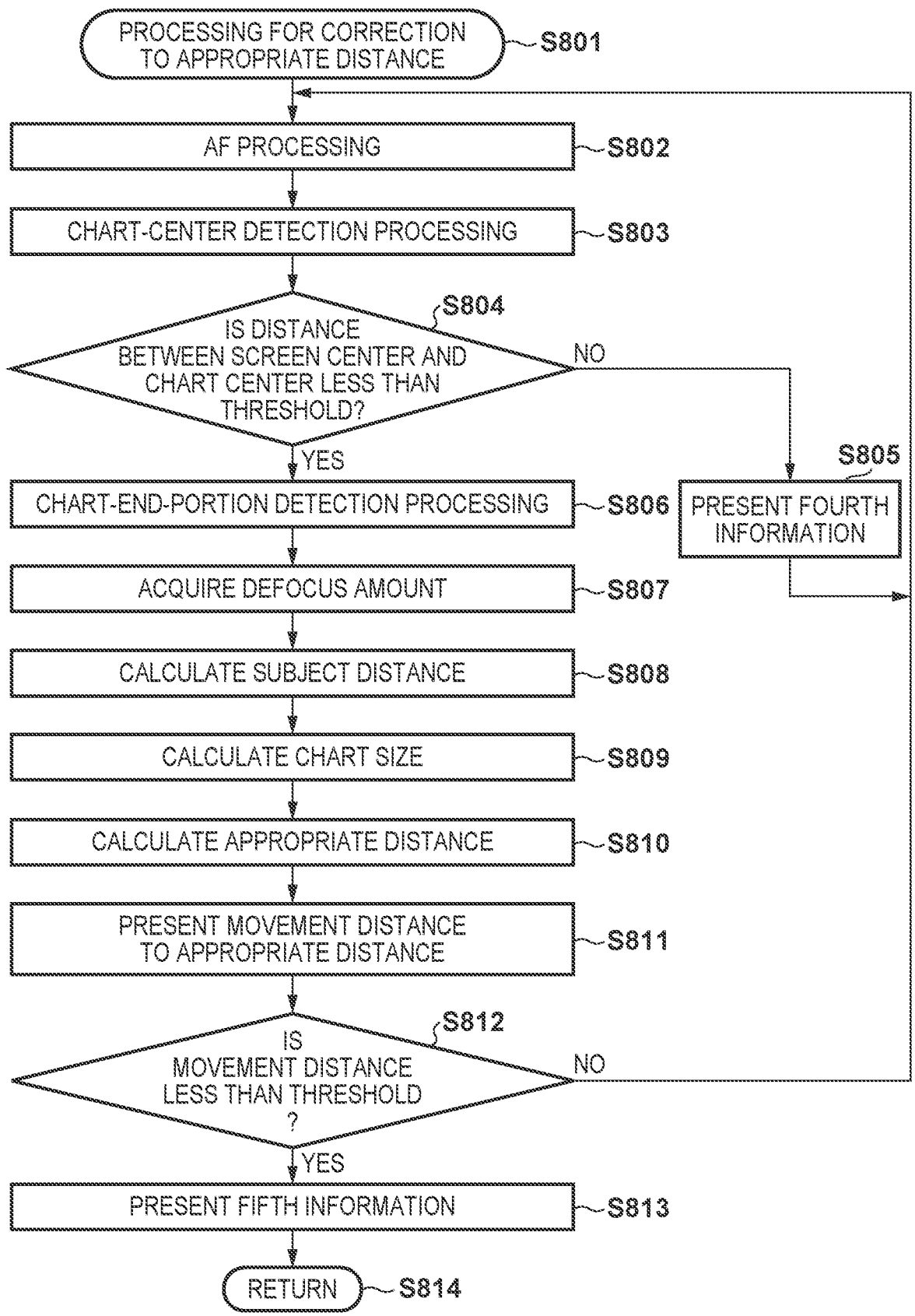

IMAGE CAPTURE APPARATUS AND CONTROL METHOD FOR CORRECTING LENS DISTORTION

BACKGROUND

Field

The present disclosure relates to techniques for adjusting a positional relationship relative to a calibration chart.

Description of the Related Art

A technique called visual effects (hereinafter "VFX"). VFX is known. It is used for combining computer graphics (hereinafter "CG") with actually shot images.

In a case in which an actually shot image and CG are to be combined in VFX, the actually shot image may need to be subjected to a correction to address distortion of the lens of the camera used to shoot the image, prior to being combined with the CG, because a difference in size between the actually shot image and the CG could occur if such combining is performed without taking the distortion into consideration. In such cases, the distortion may need to be corrected in accordance with image height because the distortion can vary depending on image height.

While the distortion can be corrected in accordance with image height if distortion-related information is provided as metadata associated with the lens attached to the camera, some lenses are not provided with distortion-related information.

If the lens is not provided with distortion-related information, information relating to the distortion of the lens needs to be acquired by shooting a calibration chart (hereinafter "chart") for correcting such lens distortion. However, the shooting of the chart involves positioning the camera lens and the chart so as to directly face one another, aligning the optical center of the camera and the center of the chart, and adjusting the angle of view to the chart.

Japanese Patent Laid-Open No. 2020-193820 and Japanese Patent Laid-Open No. 2021-027584 disclose methods for presenting the direction in which a user should rotate or move a camera in order to position the camera so as to directly face a target object.

In Japanese Patent Laid-Open No. 2020-193820 and Japanese Patent Laid-Open No. 2021-027584, because the rotation and movement amounts for positioning the camera and the target object so as to directly face one another, aligning the optical center of the camera and the center of the target object, and adjusting the angle of view to the target object are not presented, it may take time and effort to adjust the positional relationship between the camera and the target object.

SUMMARY

Various embodiments of the present disclosure realize techniques allowing more detailed information to be presented regarding operations that need to be carried out by a user during a calibration process.

According to one embodiment, the present disclosure provides an image capture apparatus that captures an image of a chart for correcting distortion of a lens, the image capture apparatus comprising: at least one processor and a memory coupled to the processor and storing instructions that when executed by the processor, cause the processor to function as: a first obtaining unit configured to obtain a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus; a second obtaining unit configured to obtain a deviation distance indicating a distance of deviation from the directly facing positional relationship based on the deviation angle and the first distance information; a third obtaining unit configured to obtain an appropriate distance between the chart and the image capture apparatus in the directly facing positional relationship based on the angle-of-view information and a size of the chart; and a presenting unit configured to present information based on the deviation angle and the deviation distance so that the directly facing positional relationship is established, and present information regarding the appropriate distance in a case in which the deviation distance and the deviation angle have each fallen below a predetermined determination threshold.

According to another embodiment, the present disclosure provides a control method for an image capture apparatus that captures an image of a chart for correcting distortion of a lens, the method comprising: a first obtaining of obtaining a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus; a second obtaining of obtaining a deviation distance indicating a distance of deviation from the directly facing positional relationship based on the deviation angle and the first distance information; a third obtaining of obtaining an appropriate distance between the chart and the image capture apparatus in the directly facing positional relationship based on the angle-of-view information and a size of the chart; and a presenting of presenting information based on the deviation angle and the deviation distance so that the directly facing positional relationship is established, and presenting information regarding the appropriate distance in a case in which the deviation distance and the deviation angle have each fallen below a predetermined determination threshold.

According to yet another embodiment, the present disclosure provides a non-transitory computer-readable storage medium storing a program for causing a processor to function as an image capture apparatus that captures an image of a chart for correcting distortion of a lens, the image capture apparatus comprising: a first obtaining unit configured to obtain a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus; a second obtaining unit configured to obtain a deviation distance indicating a distance of deviation from the directly facing positional relationship based on the deviation angle and the first distance information; a third obtaining unit configured to obtain an appropriate distance between the chart and the image capture apparatus in the directly facing positional relationship based on the angle-of-view information and a size of the chart; and a presenting unit configured to present information based on the deviation angle and the deviation distance so that the directly facing positional relationship is established, and present information regarding the appropriate distance in a case in which the deviation distance and the deviation angle have each fallen below a predetermined determination threshold.

According to various embodiments of the present disclosure, the time and effort it takes to carry out adjustment during calibration can be reduced because more detailed information regarding the operations that need to be carried out by a user during calibration can be presented.

Further features of the present disclosure will become apparent from the following description of example embodiments (with reference to the attached drawings).

BRIEF DESCRIPTION OF THE DRAWINGS

FIGS. 7A to 7D are plan views schematically illustrating positional relationships between the calibration chart and the camera in the processing for correction to the directly facing state in FIG. 5.

FIG. 8 is a flowchart illustrating processing for correction to an appropriate distance in step S403 in FIG. 4.

DESCRIPTION OF THE EMBODIMENTS

Figure 1:
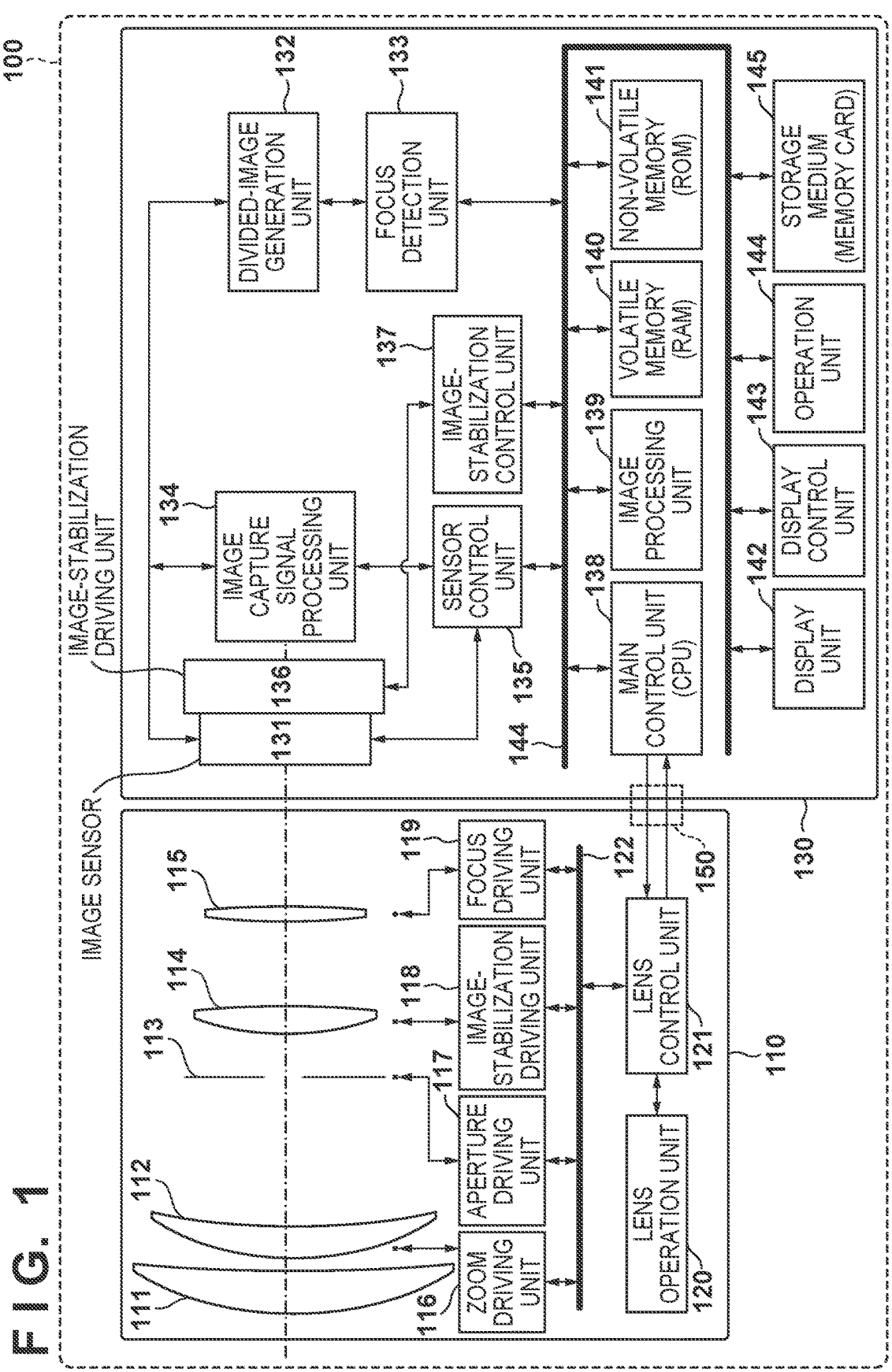
FIG. 1 is a block diagram illustrating an apparatus configuration according to the present embodiment.

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

An embodiment in which the image capture apparatus according to the present disclosure is applied to a digital video camera will be described in detail below with reference to the attached drawings. Note that the image capture apparatus is not limited to being applied to a digital video camera, and is applicable to lens-replaceable digital single-lens reflex cameras and electronic devices which have a camera function and to which lenses can be attached.

<Apparatus Configuration>

First, with reference to FIG. 1, the configuration and functions of the image capture apparatus according to the present embodiment will be described.

An image capture apparatus (hereinafter "camera") 100 according to the present embodiment includes a lens control device 110 and a camera control device 130. The lens control device 110 can be attached to and detached from the camera control device 130. At the same time as the lens control device 110 is mechanically connected to the camera control device 130 via an unillustrated lens mount of the camera control device 130, the lens control device 110 is electrically connected to the camera control device 130 via later-described electric contacts 150.

The lens control device 110 is a lens unit that includes a fixed lens group 111, a zoom lens 112, an aperture 113, an image-stabilization lens 114, and a focus lens 115 that form an image capture optical system. While the lenses 111, 112, 114, and 115 are each usually constituted from a plurality of lenses, only one lens is illustrated here for simplicity.

The lens control device 110 includes a lens control unit 121 that communicates with a camera control unit 138 of the camera control device 130 via the electric contacts 150. The lens control unit 121 is communicably connected to a zoom driving unit 116, an aperture driving unit 117, an image-stabilization driving unit 118, and a focus driving unit 119 via a bus 122.

A lens operation unit 120 includes operation members such as ring members for operating the zoom lens 112, the aperture 113, and the focus lens 115, and a switch for enabling or disabling an image-stabilization function. When an operation member is operated as a result of a user operation being performed, the lens operation unit 120 outputs operation information corresponding to the operation type to the lens control unit 121. The lens control unit 121 performs control in accordance with the operation information received from the lens operation unit 120.

The lens control unit 121 performs arithmetic processing for controlling the lens control device 110. The lens control unit 121 includes a processor, such as a CPU, for controlling the constituent elements of the lens control device 110.

The lens control unit 121 communicates with the camera control unit 138 of the camera control device 130 via electric contacts to receive control information from the camera control unit 138 and transmit lens information (optical information, etc.) held by the lens control device 110 to the camera control device 130 in response to transmission requests from the camera control unit 138 (the communication between the lens control unit 121 and the camera control unit 138 is hereinafter referred to as "lens communication").

Furthermore, the lens control unit 121 controls the zoom driving unit 116, the aperture driving unit 117, and the focus driving unit 119 in accordance with the operation information from the lens operation unit 120. In addition, the lens control unit 121 controls the zoom driving unit 116, the aperture driving unit 117, the image-stabilization driving unit 118, and the focus driving unit 119 in accordance with the control information from the camera control unit 138 of the camera control device 130.

The zoom driving unit 116 changes the focal distance by driving the zoom lens 112. The aperture driving unit 117 adjusts the light amount during shooting by driving the aperture 113 and adjusting the opening size of the aperture 113. The image-stabilization driving unit 118 reduces camera shake by driving the image-stabilization lens 114 in accordance with the shake of the lens control device 110. The focus driving unit 119 controls the focus state by driving the focus lens 115.

The camera control device 130 is a camera body that generates image data by capturing a subject image transmitted through the lens control device 110.

The camera control unit 138 performs arithmetic processing for controlling the camera control device 130. The camera control unit 138 includes a processor, such as a CPU, for controlling the constituent elements of the camera control device 130.

The camera control unit 138 communicates with the lens control unit 121 of the lens control device 110 via the electric contacts 150. The camera control unit 138 transmits control signals to the lens control unit 121 to drive the lenses and the aperture in the lens control device 110, and receives, from the lens control unit 121, the lens information (optical information, etc.) held by the lens control device 110. The electric contacts 150 include a pair of communication terminals (camera-side terminal and lens-side terminal) corresponding to a pair of communication lines via which the lens control device 110 and the camera control device 130 can bidirectionally communicate.

A light flux transmitted through the lens control device 110 is made into an image by the image capture optical system and received by an image sensor 131 as an optical image (subject image) of a subject. The subject image received by the image sensor 131 is converted into an electric signal by a photoconversion element such as a CMOS sensor of the image sensor 131. The electric signal generated by the image sensor 131 is processed as an image signal (image data) by an image capture signal processing unit 134.

In the image sensor 131, a plurality of pixels are arrayed two-dimensionally. The plurality of pixels each include a pair of photoelectric conversion units (photodiodes), and one microlens that is provided so as to correspond to the photoelectric conversion units. Light incident on each pixel is subjected to pupil division by the microlens, and a pair of subject images are formed on the pair of photoelectric conversion units. The photoelectric conversion units constituting the pair each accumulate electric charge by performing photoelectric conversion.

A divided-image generation unit 132 reads, as focus detection signals (an A image signal and a B image signal), output signals having voltages in accordance with the electric charge accumulated in the pair of photoelectric conversion units in each pixel. Furthermore, the divided-image generation unit 132 combines the A image signal and the B image signal read from each pixel of the image sensor 131. The A image signal and the B image signal are used for focus detection according to the phase difference detection method. The signal obtained by combining the A image signal and the B image signal is used to generate the image signal.

A focus detection unit 133 calculates the phase difference between the A image signal and the B image signal by performing a correlation operation on the A image signal and the B image signal. Furthermore, the focus detection unit 133 calculates a defocus amount indicating a focusing state of the image capture optical system from the phase difference between the A image signal and the B image signal.

Based on defocus amounts calculated by the focus detection unit 133, the camera control unit 138 performs autofocus (AF) processing in which the focus lens 115 is driven by controlling the lens control unit 121 and the focus driving unit 119 of the lens control device 110. Thus, a focusing state of the image capture optical system can be achieved.

The image data output from the image capture signal processing unit 134 is output to a sensor control unit 135, and is temporarily stored in a volatile memory 140. Furthermore, the image data is stored to a recording medium 145, which is a memory card or the like, after correction processing and compression processing are executed thereon by an image processing unit 139.

Furthermore, concurrently with the AF processing, processing for decreasing or increasing the size of the image data stored in the volatile memory 140 to a size that is most suitable for a display unit 142 that is built into the camera control device 130 or attached to the camera control device 130 is performed by a display control unit 143 in accordance with control by the camera control unit 138. The image data processed into the most-suitable size is temporarily stored in the volatile memory 140 once again, this time in an area that is different from that prior to the processing. Furthermore, the display control unit 143 outputs the image data to the display unit 142 in a state in which various types of image information such as shooting settings are overlaid on the image data as characters, icons, and the like, and the display unit 142 displays the image data having various types of information overlaid thereon on a display device that is constituted from an organic EL or liquid-crystal panel, or the like. Thus, the user can monitor an image (live view image) captured by the image sensor 131 in real time.

In accordance with control by the camera control unit 138, an image-stabilization control unit 137 controls an image-stabilization driving unit 136 and moves the image sensor 131 in a direction in which camera shake is reduced. Furthermore, by cooperating with the image-stabilization driving unit 118 of the lens control device 110, the image-stabilization driving unit 136 can also drive the image sensor 131 and the image-stabilization lens 114 in an interlocked state. In this case, image stabilization stronger than that when the image sensor 131 and the image-stabilization lens 114 are individually driven can be achieved.

An operation unit 144 is constituted from operation members such as switches, buttons, rings, and levers for receiving user operations, and outputs, to the camera control unit 138, operation signals corresponding to the operation members operated by the user. The camera control unit 138 outputs control signals to the constituent elements of the camera control device 130 based on the operation signals and controls the constituent elements. For example, the operation members also include a touch panel that is formed integrally with the display unit 142, etc.

The volatile memory 140 is a RAM, for example. Not only is the volatile memory 140 used to temporarily store image data, but the volatile memory 140 is also used as a work area for temporarily storing data used in processing for controlling the constituent elements of the camera control device 130, the lens information acquired from the lens control device 110, etc.

A non-volatile memory 141 has stored therein a control program that is necessary for the camera 100 to operate. When the power is turned on by a user operation and the camera 100 is activated, the control program stored in the non-volatile memory 141 is loaded to a section of the volatile memory 140. The camera control unit 138 controls the operation of the camera 100 in accordance with the control program loaded to the volatile memory 140.

In a calibration chart (hereinafter "chart") that the camera 100 shoots in order to correct lens distortion, position detection markers 303, 304a, and 304b are provided at the center position and end portions on both sides of the center in a direction that is horizontal to the ground, as in the image (captured image) 300 illustrated in FIG. 3 obtained by shooting the chart. It is sufficient that the positions of the markers 303, 304a, and 304b can be detected, and a method of forming specific patterns in the center and end portions of the chart and detecting the specific patterns may also be adopted, for example. A chart characterized as such is arranged horizontally with respect to the ground and is shot for calibration.

Next, calibration-related processing by the camera 100 according to the present embodiment will be described.

Figure 2:
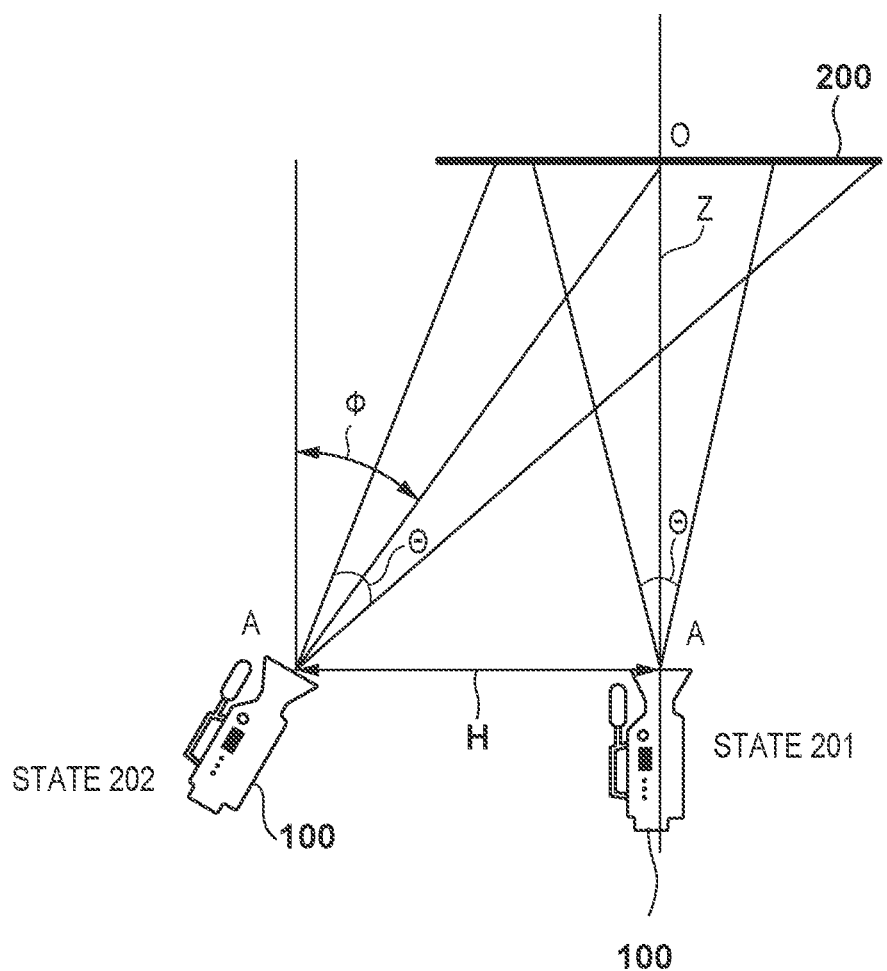
FIG. 2 is a plan view schematically illustrating positional relationships between a calibration chart and a camera according to the present embodiment.

FIG. 2 is a plan view schematically illustrating positional relationships between the chart and the camera according to the present embodiment.

In FIG. 2, A is the optical center (optical axis) of the camera 100, θ is the angle of view of the camera 100, and O is the center of a chart 200. The present embodiment allows the user to easily correct the positional relationship between the camera 100 and the chart 200 from a state 202 in which the camera 100 and the chart 200 are not directly facing one another to a state 201 in which the camera 100 and the chart 200 are directly facing one another. Thus, in the present embodiment, the angle 1 formed by a line AO connecting the chart center O and the optical center A of the camera 100 and a normal line Z extending from the chart center O, and the distance H between the normal line Z and the optical center A of the camera 100 are calculated. Furthermore, in the present embodiment, the user can easily perform correction to the directly facing positional relationship between the camera 100 and the chart 200 as a result of information indicating the amount and direction in which the camera 100 is to be rotated and moved being presented to the user based on the deviation angle Φ and the deviation movement amount H. In the present embodiment, the directly facing positional relationship between the camera 100 and the chart 200 is a state in which the angle Φ formed by the line AO connecting the chart center O and the optical center A of the camera 100 and the normal line Z extending from the chart center O, and the distance H between the normal line Z and the optical center A of the camera 100 have each fallen below a corresponding predetermined determination threshold.

Figure 4:
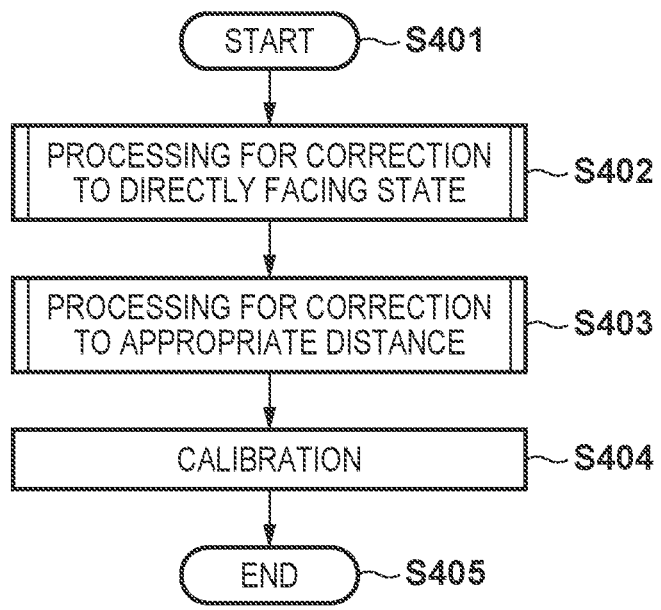
FIG. 4 is a flowchart illustrating a processing procedure during the calibration according to the present embodiment.

FIG. 4 is a flowchart illustrating a processing procedure during the calibration according to the present embodiment.

Note that the processing in FIG. 4 is realized by the camera control unit 138 of the camera control device 130 controlling the constituent elements of the camera control device 130 by executing the program stored in the non-volatile memory 141. Furthermore, the processing in FIG. 4 is started in step S401 when the user operates the operation unit 144 and inputs a calibration start instruction to the camera 100.

Processing for correction to the directly facing state of the camera 100 relative to the chart 200 is performed in step S402, and processing advances to step S403. The processing in step S402 will be described later with reference to FIG. 5.

Processing for correcting the distance between the center of the chart 200 and the optical center of the camera 100 in the directly facing state to an appropriate distance is performed in step S403, and processing advances to step S404. The processing in step S403 will be described later with reference to FIGS. 8 and 9.

Calibration is performed in step S404.

The calibration can be performed accurately because shooting can be performed in a state in which the camera 100 has been placed in the directly facing state relative to the chart 200, and the chart 200 is included within a shootable range (within the angle of view) of the camera 100 through the processing in steps S402 and S403, as described above.

Next, the processing for correction to the directly facing state in step S402 in FIG. 4 will be described with reference to FIG. 5.

Figure 5:
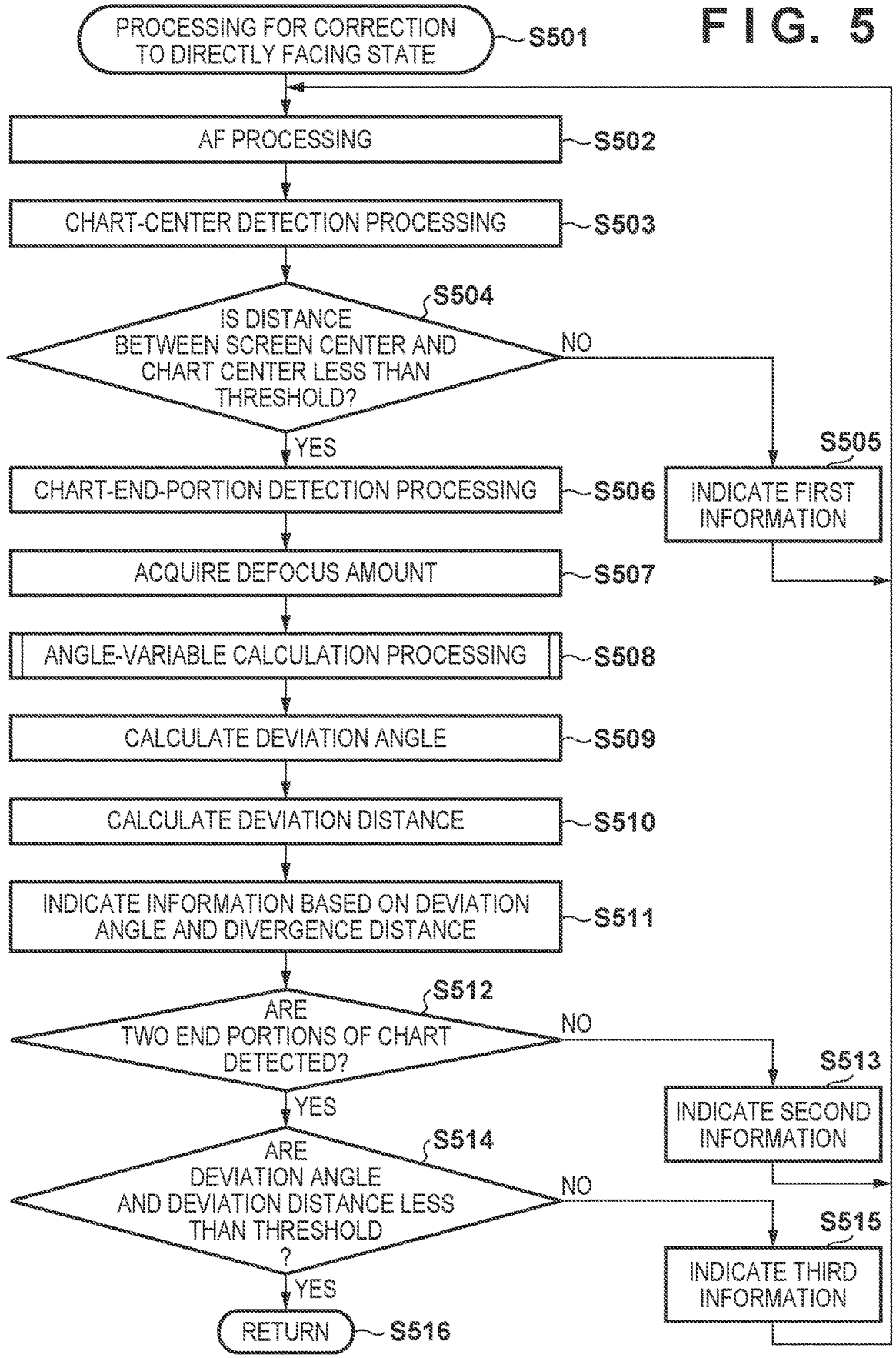
FIG. 5 is a flowchart illustrating processing for correction to a directly facing state in step S402 in FIG. 4.

FIG. 5 is a flowchart illustrating the processing for correction to the directly facing state in step S402 in FIG. 4.

Processing is started in step S501 and advances to step S502.

In step S502, the camera control unit 138 executes AF processing using an image (captured image) of the chart 200 captured using the image sensor 131.

In step S503, the camera control unit 138 performs chart-center detection processing by detecting, in the captured image acquired from the image processing unit 139, the center detection marker (303 in FIG. 3) indicating the chart center.

In step S504, the camera control unit 138 determines whether or not the distance between the chart center acquired in step S503 and the center of the captured image (screen center) is less than a predetermined determination threshold. In order to facilitate the operation of positioning the camera 100 and the chart 200 relative to one another, assistance may be provided such that a mark is displayed at the screen center using the display control unit 143. The camera control unit 138 advances processing to step S505 upon determining that the distance between the chart center and the screen center is more than or equal to the predetermined determination threshold. The camera control unit 138 advances processing to step S506 upon determining that the distance between the chart center and the screen center is less than the predetermined determination threshold.

In step S505, the camera control unit 138 controls the display control unit 143 and displays, on the display unit 142, first information indicating to the user that the camera 100 is to be moved so that the screen center approaches the chart center. Subsequently, the camera control unit 138 returns processing to step S502, and repeats the processing from step S502 to step S505 until the distance between the chart center and the screen center falls below the predetermined determination threshold in step S504.

In step S506, the camera control unit 138 performs chart-end-portion detection processing by detecting, in the captured image acquired from the image processing unit 139, the end-portion detection markers (304a and 304b in FIG. 3) indicating the chart end portions, and stores the detected number of chart end portions in the volatile memory 140.

In step S507, the camera control unit 138 acquires the defocus amount of each pixel from the focus detection unit 133, and, based on the defocus amount, calculates a focus driving amount for driving the focus lens 115 so that the image capture optical system is in the focusing state. Furthermore, the camera control unit 138 calculates a subject distance based on the focus driving amount, the current focus-lens position information, and focal distance information. Thus, a defocus map indicating the subject distance at each position of the captured image can be acquired.

In step S508, the camera control unit 138 performs processing for calculating an angle variable that will be described later with reference to FIG. 6.

In step S509, the camera control unit 138 calculates the deviation angle Φ based on the angle variable Ψ calculated in step S508.

Figure 7A:
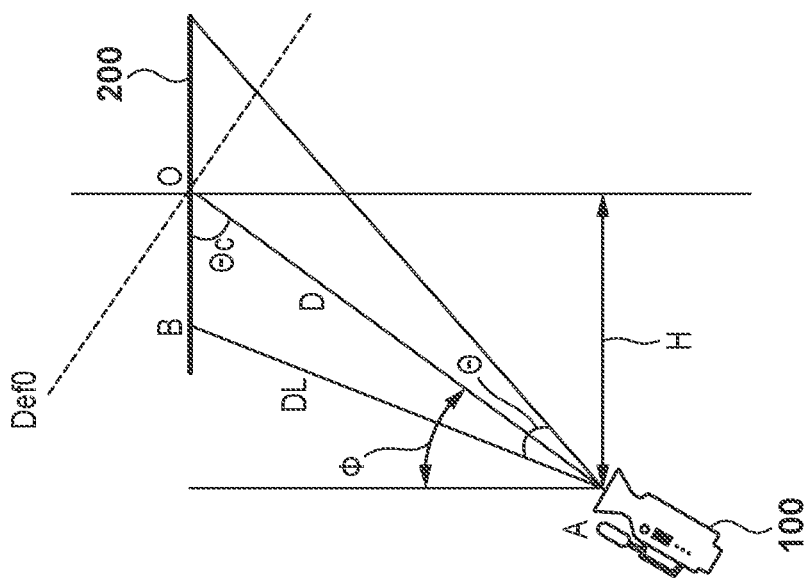
Figure 7B:
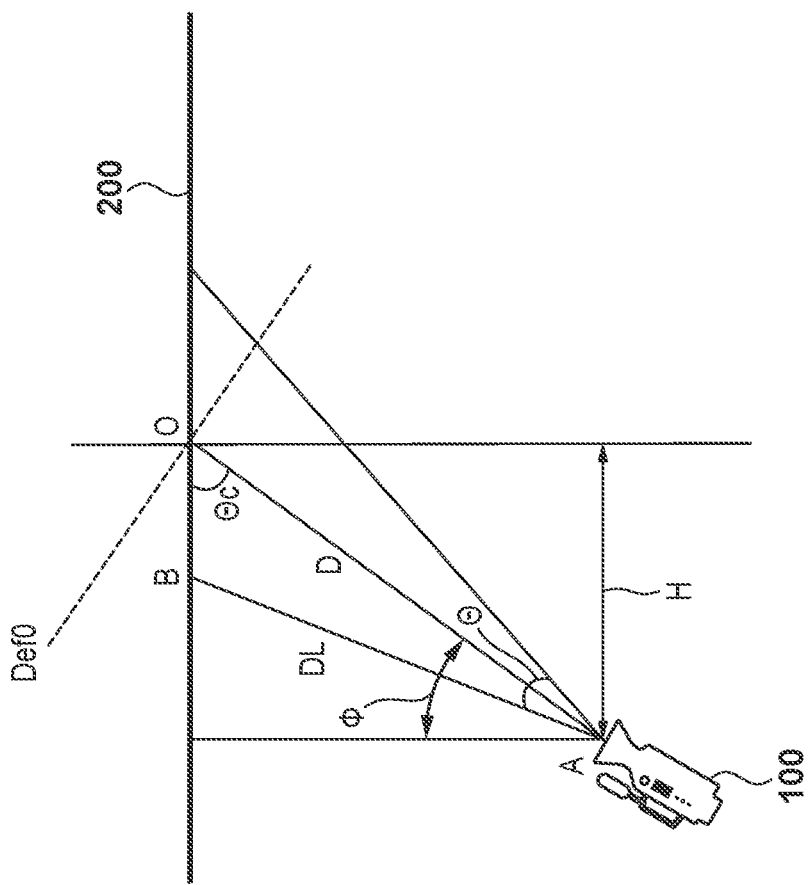

FIGS. 7A to 7D are plan views schematically illustrating positional relationships between the chart and the camera in the processing for correction to the directly facing state in FIG. 5. FIG. 7A is a diagram illustrating a positional relationship between the chart 200 and the camera 100 in a case in which the screen ends (both ends of the angle of view) of the camera 100 are located within the chart 200. FIG. 7B is a diagram illustrating a positional relationship between the chart 200 and the camera 100 in a case in which one end of the angle of view of the camera 100 is located within the chart 200. FIG. 7C is a diagram illustrating a positional relationship between the chart 200 and the camera 100 in a case in which one end of the angle of view of the camera 100 is located within the chart 200 and the other end is not. FIG. 7D is a diagram illustrating a positional relationship between the chart 200 and the camera 100 in a case in which the chart 200 is located within the angle of view of the camera 100. In the examples in FIGS. 7A to 7D, A is the optical center (the optical axis of the image capture optical system) of the camera 100, O is the chart center, B is a limit position at which subject distance can be detected as a result of the camera 100 performing ranging, and the angle OAB is the angle variable Ψ.

Angle-of-view information Θ of the camera 100 can be calculated using Equation 1 below, where D is the distance from the optical center A of the camera 100 to the chart center O, 1 [mm] is the focal distance of the camera 100, and s [mm] is the image-sensor size of the camera 100.

$$\Theta = 2a\tan\left(\frac{s}{2l}\right) \quad \text{(Equation 1)}$$

Furthermore, using the angle variable Ψ, the following relational expressions hold true regarding the angle $\Theta_c$ formed by AO and the chart 200 based on the law of cosines, focusing on the triangle OAB.

$$OB = \sqrt{AB^2 + AO^2 - 2AB*AO*\cos\Psi} \quad \text{(Equation 2)}$$

$$\Theta_c = a\cos\left(\frac{OB^2 + AO^2 - AB^2}{2OB*AO}\right)$$

$$\Phi = 90[\deg] - \Theta_C$$

In this case, the deviation angle Φ can be calculated by substituting distance information DL and D for AB and AO in Equation 2 above. The distance information D is information corresponding to the distance from the optical center A of the camera 100 to the chart center O. The distance information DL is information corresponding to the distance from the optical center A of the camera 100 to the angle-of-view end B. If the end-portion detection markers are successfully detected, a value calculated from the defocus amount at a chart end portion is substituted for AB, and, if the end-portion detection markers are not successfully detected, a value calculated from the defocus amount at an end portion (screen end) of the captured image is substituted for AB. Furthermore, the subject distance at the chart center O is substituted for AO because the center-position detection marker is successfully detected.

Returning to FIG. 5, in step S510, the camera control unit 138 calculates the deviation distance H to the chart 200. The deviation distance H can be calculated from Equation 3 below.

$$H = AO*\sin\Phi \quad \text{(Equation 3)}$$

The deviation distance H can be calculated by substituting the deviation angle Φ into Equation 3 above and substituting the distance D for AO in Equation 3.

In step S511, the camera control unit 138 controls the display control unit 143 and displays, on the display unit 142, information based on the deviation angle Φ and the deviation distance H calculated in steps S509 and S510.

Figure 3:
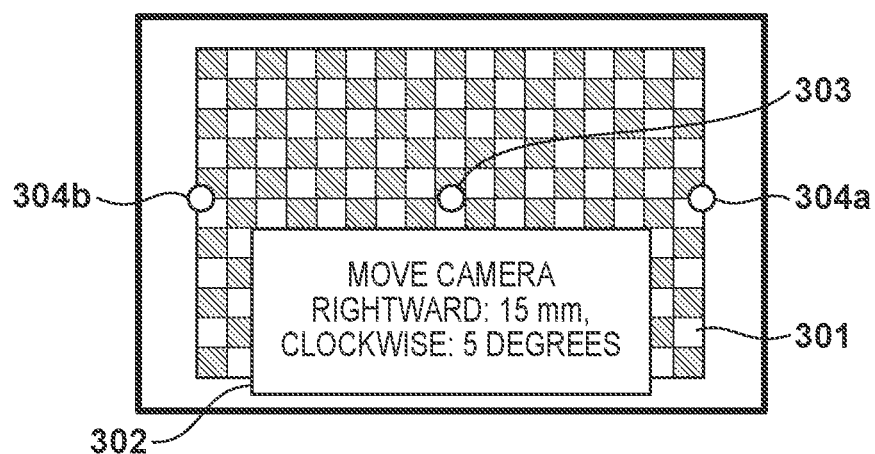
FIG. 3 is a diagram illustrating an example of display of information presented during calibration according to the present embodiment.

FIG. 3 illustrates an example of display of the information based on the deviation angle 1 and the deviation distance H displayed on the display unit 142 in step S511. On the screen of the display unit 142, a captured image 301 of the chart 200 is displayed, and information 302 indicating the amount and direction in which the camera 100 is to be rotated and moved is displayed based on the deviation angle Φ and the deviation distance H necessary for correcting the position of the camera 100 to place the camera 100 and the chart 200 in the directly facing positional relationship. The user can place the camera 100 and the chart 200 in the directly facing positional relationship by performing fine adjustment of the position of the camera 100 while viewing the rotation direction and moving direction indicated in the information 302.

In step S512, the camera control unit 138 determines whether or not the number of chart end portions detected in step S506 is two. Upon determining that the number of chart end portions is one or less, the camera control unit 138 determines that the chart 200 is not located within the angle of view of the camera 100 (the captured image), and advances processing to step S513. Upon determining that the number of chart end portions is two, the camera control unit 138 determines that the chart 200 is located within the angle of view of the camera 100 (the captured image), and advances processing to step S514.

In step S513, the camera control unit 138 controls the display control unit 143 and displays, on the display unit 142, second information indicating to the user that the camera 100 is to be moved so that the two chart end portions are located within the angle of view of the camera 100 (the captured image). Subsequently, the camera control unit 138 returns processing to step S502, and repeats the processing from step S502 to step S513 until the two chart end portions are located within the angle of view of the camera 100 (the captured image) in step S512.

In step S514, the camera control unit 138 determines whether or not the deviation angle Φ and the deviation distance H are each less than the corresponding predetermined determination threshold. The camera control unit 138 terminates processing in step S516 upon determining that the deviation angle Φ and the deviation distance H are each less than the corresponding determination threshold, and advances processing to step S515 upon determining that the deviation angle Φ and the deviation distance H are each more than or equal to the determination threshold.

In step S515, the camera control unit 138 controls the display control unit 143 and displays, on the display unit 142, third information indicating the amount and direction in which the camera 100 is to be rotated and moved based on the deviation angle Φ and the deviation distance H calculated in steps S509 and S510. Subsequently, the camera control unit 138 returns processing to step S502, and repeats the processing from step S502 to step S515 until the deviation angle Φ and the deviation distance H each fall below the corresponding determination threshold in step S514.

Note that a configuration may be adopted such that the determination thresholds in step S504 and S514 can be changed by the user using the operation unit 144, and the smaller the values, the more accurately the camera 100 and the chart can be placed in the directly facing positional relationship.

Figure 9:
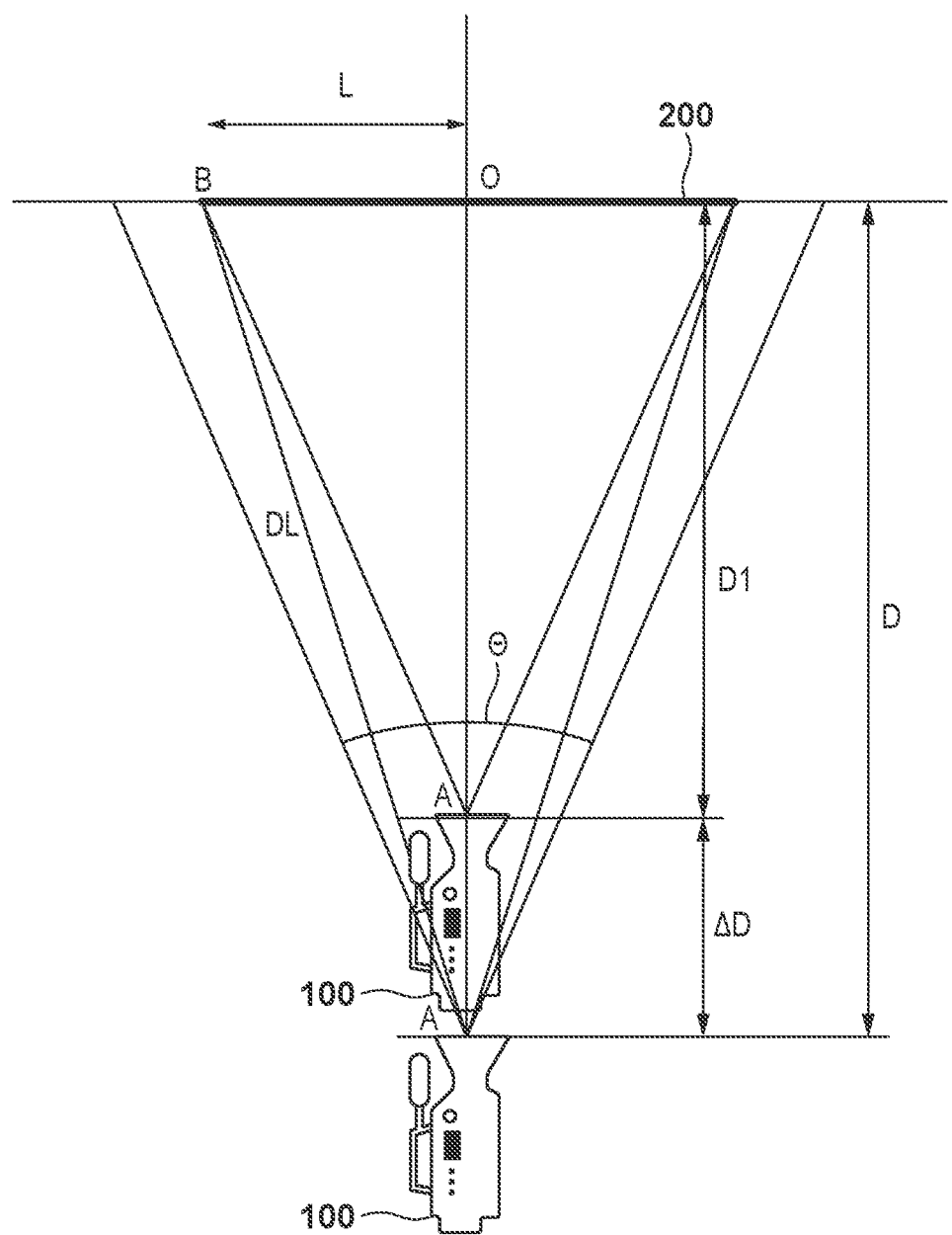
FIG. 9 is a plan view schematically illustrating positional relationships between the calibration chart and the camera in the processing for correction to the appropriate distance in step S403 in FIG. 4.

FIG. 8 is a flowchart illustrating the processing for correction to the appropriate distance in step S403 in FIG. 4. FIG. 9 is a plan view schematically illustrating positional relationships between the chart and the camera in the processing for correction to the appropriate distance in step S403 in FIG. 4.

As illustrated in FIG. 9, A is the optical center of the camera 100 prior to the correction in FIG. 8, B is the left end of the chart 200, O is chart center, and Θ is the angle of view of the camera 100. The processing illustrated in FIG. 8 is processing for correcting the distance between the camera 100 and the chart 200 to the appropriate distance by moving the camera 100 in a direction that is perpendicular to the chart center (front-rear direction; normal line direction).

Processing is started in step S801 in FIG. 8 and advances to step S802.

In step S802, the camera control unit 138 executes AF processing using an image (captured image) of the chart 200 captured using the image sensor 131.

In step S803, the camera control unit 138 performs chart-center detection processing by detecting, in the captured image acquired from the image processing unit 139, the center detection marker (303 in FIG. 3) indicating the chart center.

In step S804, the camera control unit 138 determines whether or not the distance between the chart center acquired in step S803 and the center of the captured image (screen center) is less than a predetermined determination threshold. In order to facilitate the operation of positioning the camera 100 and the chart 200 relative to one another, assistance may be provided such that a mark is displayed at the screen center using the display control unit 143. The camera control unit 138 advances processing to step S805 upon determining that the distance between the chart center and the screen center is more than or equal to the predetermined determination threshold. The camera control unit 138 advances processing to step S806 upon determining that the distance between the chart center and the screen center is less than the predetermined determination threshold.

In step S805, the camera control unit 138 controls the display control unit 143 and displays, on the display unit 142, fourth information indicating to the user that the camera 100 is to be moved so that the screen center approaches the chart center. Subsequently, the camera control unit 138 returns processing to step S802, and repeats the processing from step S802 to step S805 until the distance between the chart center and the screen center falls below the predetermined determination threshold in step S804.

In step S806, the camera control unit 138 performs chart-end-portion detection processing by detecting, in the captured image acquired from the image processing unit 139, the end-portion detection markers (304a and 304b in FIG. 3) indicating the chart end portions, and stores the detected number of chart end portions in the volatile memory 140.

In step S807, the camera control unit 138 acquires the defocus amount of each pixel from the focus detection unit 133, and, based on the defocus amount, calculates a focus driving amount for driving the focus lens 115 so that the image capture optical system is in the focusing state. Furthermore, the camera control unit 138 calculates a subject distance based on the focus driving amount, the current focus-lens position information, and focal distance information. Thus, a defocus map indicating the subject distance at each position of the captured image can be acquired.

In step S808, as illustrated in FIG. 9, the camera control unit 138 calculates distance information D from the optical center of the camera 100 to the chart center O, and distance information DL from the optical center of the camera 100 to the chart end portion B from the chart center position, the chart end portion position, and the defocus amounts acquired in steps S803, S806, and S807. Note that, while the left-side chart end portion B is chosen in the example in FIG. 9, the right-side chart end portion may be chosen.

In step S809, the camera control unit 138 calculates the chart size L using the distance information DL and D calculated in step S808. In FIG. 9, the chart size L can be calculated using Equation 4 below by applying the Pythagorean theorem to the triangle AOB.

$$L=\sqrt{D_L^2 - D^2} \quad \text{(Equation 4)}$$

In step S810, the camera control unit 138 calculates the appropriate distance D1 of the subject distance D at the chart center O. The appropriate distance D1 can be calculated using Equation 5 below.

$$D1 = \frac{\sqrt{D_L^2 - D^2}}{\tan\left(\frac{\Theta}{2}\right)} \quad \text{(Equation 5)}$$

In this case, a movement distance ΔD of the subject distance D to the appropriate distance D1 at the chart center O can be calculated using Equation 6 below.

$$\Delta D = D - \frac{\sqrt{D_L^2 - D^2}}{\tan\left(\frac{\Theta}{2}\right)} \quad \text{(Equation 6)}$$

In step S811, the camera control unit 138 controls the display control unit 143 and displays, on the display unit 142, information regarding the movement amount ΔD of the camera 100 to the appropriate distance D1 calculated in step S811. Thus, the user can perform fine adjustment of the position of the camera 100 while viewing the information regarding the movement amount ΔD.

In step S812, the camera control unit 138 determines whether or not the camera 100 and the chart 200 have approached one another to the appropriate distance D1, or in other words, whether or not the movement distance ΔD is less than a predetermined determination threshold. Upon determining that the camera 100 and the chart 200 have approached one another to the appropriate distance D1, or in other words, that the movement distance ΔD is less than the predetermined determination threshold, the camera control unit 138 advances processing to step S813. Upon determining that the camera 100 and the chart 200 have not approached one another to the appropriate distance D1, or in other words, that the movement distance ΔD is more than or equal to the predetermined determination threshold, the camera control unit 138 returns processing to step S802, and repeats the processing in steps S802 to S812 until the camera 100 and the chart 200 approach one another to the appropriate distance D1, or in other words, the movement distance ΔD falls below the predetermined determination threshold.

In step S813, the camera control unit 138 controls the display control unit 143 and displays, on the display unit 142, fifth information indicating that the camera 100 and the chart 200 have approached one another to the appropriate distance D1, and terminates processing in step S814.

Note that a configuration may be adopted such that the determination thresholds in step S804 and S812 can be changed by the user using the operation unit 144, and the smaller the values, the more accurately the distance between the camera 100 and the chart can be brought closer to the appropriate distance D1.

Here, with reference to FIG. 6, the processing in step S508 in FIG. 5 for calculating the angle variable Ψ (angle OAB) to be used to calculate the deviation angle Φ will be described.

Figure 6:
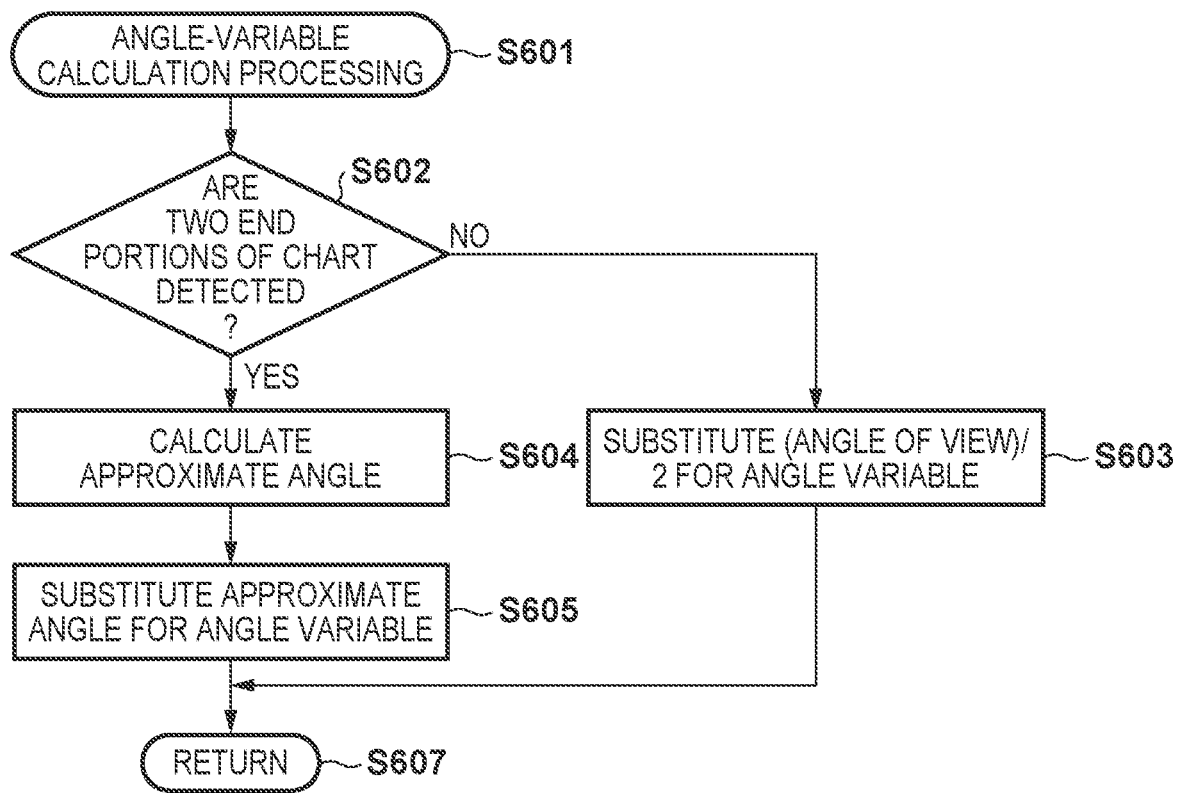
FIG. 6 is a flowchart illustrating angle-variable calculation processing in step S508 in FIG. 5.

FIG. 6 is a flowchart illustrating the angle-variable calculation processing in step S508 in FIG. 5.

Processing is started in step S601 in FIG. 6 and advances to step S602.

In step S602, the camera control unit 138 refers to the number of chart end portions that have been detected and stored in the volatile memory 140 in step S506 in FIG. 5, and determines whether or not the number of chart end portions is two. The camera control unit 138 advances processing to step S604 upon determining that the number of chart end portions is two, and advances processing to step S603 upon determining that the number of chart end portions is one or less.

In step S603, the camera control unit 138 substitutes a value obtained by halving the angle of view Θ(Θ/2; first angle-of-view information) for the angle variable T. For example, this corresponds to the cases in FIGS. 7A to 7C (cases in which the angle-of-view end B is located within the chart).

In step S604, the camera control unit 138 calculates an approximate angle λ (second angle-of-view information), and substitutes the approximate angle λ for the angle variable Ψ. For example, this corresponds to the case in FIG. 7D (case in which the two ends of the angle of view are both located outside the chart end portions). In the example in FIG. 7D, the value (Θ/2) obtained by halving the angle of view Θ cannot be adopted as the angle variable λ because neither one of the two ends of the angle of view is located within the chart. Thus, the camera control unit 138 calculates the approximate angle λ based on Equation 7 below using the ratio between the distance OC from the angle-of-view center (chart center O) to the angle-of-view end C and the distance OB from the angle-of-view center (chart center O) to the chart end B in the captured image.

$$\lambda = \frac{\Theta}{2} * \frac{OC}{OB} \quad \text{(Equation 7)}$$

In step S605, the camera control unit 138 substitutes the approximate angle λ calculated in step S604 for the angle variable Ψ, and advances processing to step S509 in FIG. 5.

As described above, according to the present embodiment, information regarding the direction and amount in which the camera 100 is to be rotated and moved relative to the chart center O in order to correct the position of the camera 100 to the state in which the camera 100 is directly facing the chart 200 is presented to the user. Furthermore, according to the present embodiment, information regarding the movement amount ΔD of the camera 100 to the appropriate distance D1 is presented to the user in the state in which the camera 100 and the chart 200 are directly facing one another so that the distance between the camera 100 and the chart 200 can be corrected to the appropriate distance D1. As a result of more detailed information regarding operations that need to be performed by the user during calibration being presented in such a manner, the time and effort it takes to carry out operations necessary for positioning the camera 100 and the chart 200 relative to one another during calibration can be reduced.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2022-007274, filed Jan. 20, 2022 which is hereby incorporated by reference herein in its entirety.

What is claimed is:

1. An image capture apparatus comprising:
an image capturing unit that captures one or more images of a chart for correcting distortion of a lens;
at least one processor; and
a memory coupled to the at least one processor and storing instructions that, when executed by the at least one processor, cause the at least one processor to:
calculate a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus,
calculate a deviation distance indicating a distance of deviation from the directly facing positional relationship based on the deviation angle and the first distance information,
calculate an appropriate distance between the chart and the image capture apparatus in the directly facing positional relationship based on the angle-of-view information and a size of the chart, perform control to display information based on the deviation angle and the deviation distance so that the directly facing positional relationship is established, and information regarding the appropriate distance, in a case in which the deviation distance and the deviation angle have each fallen below a respective predetermined threshold, until a distance between the center of the chart and a respective center of one of the one or more images of the chart falls below a predetermined distance threshold in the directly facing positional relationship, perform control to display second information indicating to a user that the image capture apparatus is to be moved toward the center of the chart, and perform control to display the information regarding the appropriate distance in a case in which the distance between the center of the chart and the respective center of one of the one or more images falls below the predetermined distance threshold.

2. The image capture apparatus according to claim 1, wherein the instructions further cause the at least one processor to:

calculate distances from the image capture apparatus to the chart based on position information of the lens and defocus amounts obtained from at least one of the one or more images of the chart, calculate the size of the chart based on the first distance information and the second distance information, calculate a distance from the image capture apparatus to the appropriate distance based on the distances from the image capture apparatus to the chart and the appropriate distance, and perform control to, in a case in which the deviation distance and the deviation angle have each fallen below the respective predetermined threshold, display a movement amount of the image capture apparatus such that a distance from the image capture apparatus to the chart can be brought closer to the appropriate distance.

3. The image capture apparatus according to claim 2, wherein the instructions further cause the at least one processor to:

detect the center of the chart in at least one of the one or more images of the chart;

detect the end portion of the chart in at least one of the one or more images of the chart;

calculate the defocus amounts from at least one of the one or more images of the chart;

detect the end portion of the chart in a case in which a distance between a center of the captured image and the center of the chart falls below a predetermined determination threshold; and calculate the distances to the chart based on subject distances in a focusing state that are obtained from the defocus amounts and the position information of the lens.

4. The image capture apparatus according to claim 3, wherein the end portion of the chart is one of two end portions of the chart that are provided at two ends of the chart at both sides of the center of the chart in a direction that is horizontal to the center of the chart, and wherein the instructions further cause the at least one processor to calculate the deviation angle using first angle-of-view information obtained by halving the angle of view when a number of end portions of the chart detected in the one or more images of the chart is one or less, and calculate the deviation angle using second angle-of-view information obtained by approximation using a distance from the center of the chart to the two ends of the angle of view and a distance from the center of the chart to the two end portions of the chart when the number of end portions of the chart detected in the one or more images of the chart is two and neither one of the two ends of the angle of view is located within the chart.

5. The image capture apparatus according to claim 1, wherein the instructions further cause the at least one processor to:

perform control to display third information indicating that a distance from the image capture apparatus to the appropriate distance has fallen below the predetermined distance threshold.

6. The image capture apparatus according to claim 1, wherein the directly facing positional relationship is a state in which an angle between a line connecting the optical center of the image capture apparatus and the center of the chart and a normal line extending from the center of the chart, and a distance between the optical center of the image capture apparatus and the normal line, have each fallen below a respective predetermined determination threshold.

7. An image capture apparatus comprising:

an image capturing unit that captures one or more images of a chart for correcting distortion of a lens;

at least one processor; and a memory coupled to the at least one processor and storing instructions that, when executed by the at least one processor, cause the at least one processor to:

calculate a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus, calculate a deviation distance indicating a distance of deviation from the directly facing positional relationship based on the deviation angle and the first distance information, calculate an appropriate distance between the chart and the image capture apparatus in the directly facing positional relationship based on the angle-of-view information and a size of the chart, perform control to display information based on the deviation angle and the deviation distance so that the directly facing positional relationship is established, and information regarding the appropriate distance, in a case in which the deviation distance and the deviation angle have each fallen below a respective predetermined threshold, until two end portions of the chart are detected in at least one of the one or more images of the chart, perform control to display first information indicating to a user that the image capture apparatus is to be moved so that the two end portions of the chart are located within the angle of view of the image capture apparatus, and perform control to display the information based on the deviation angle and the deviation distance so that the directly facing positional relationship is established until the deviation angle and the deviation distance each fall below the respective predetermined threshold.

8. A control method for an image capture apparatus, the method comprising:
- capturing one or more images of a chart for correcting distortion of a lens;
- calculating a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus;
- calculating a deviation distance indicating a distance of deviation from the directly facing positional relationship based on the deviation angle and the first distance information;
- calculating an appropriate distance between the chart and the image capture apparatus in the directly facing positional relationship based on the angle-of-view information and a size of the chart; and
- performing control to display information based on the deviation angle and the deviation distance so that the directly facing positional relationship is established, and display information regarding the appropriate distance in a case in which the deviation distance and the deviation angle have each fallen below a respective predetermined threshold;
- until a distance between the center of the chart and a respective center of one of the one or more images of the chart falls below a predetermined distance threshold in the directly facing positional relationship, performing control to display second information indicating to a user that the image capture apparatus is to be moved toward the center of the chart; and
- performing control to display the information regarding the appropriate distance in a case in which the distance between the center of the chart and the respective center of one of the one or more images falls below the predetermined distance threshold.

9. The control method according to claim 8, further comprising:
- calculating distances from the image capture apparatus to the chart based on position information of the lens and defocus amounts obtained from at least one of the one or more images of the chart;
- calculating the size of the chart based on the first distance information and the second distance information;
- calculating a distance from the image capture apparatus to the appropriate distance based on the distances from the image capture apparatus to the chart and the appropriate distance; and
- in a case in which the deviation distance and the deviation angle have each fallen below the respective predetermined threshold, displaying a movement amount of the image capture apparatus such that a distance from the image capture apparatus to the chart can be brought closer to the appropriate distance.

10. The control method according to claim 9, further comprising:
- detecting the center of the chart in at least one of the one or more images of the chart;
- detecting the end portion of the chart in at least one of the one or more images of the chart in a case in which a distance between a center of the captured image and the center of the chart falls below a predetermined determination threshold; and
- calculating the defocus amounts from at least one of the one or more images of the chart,
- wherein the distances from the image capture apparatus to the chart are calculated based on subject distances in a focusing state that are obtained from the defocus amounts and the position information of the lens.

11. The control method according to claim 10,
- wherein the end portion of the chart is one of two end portions of the chart that are provided at two ends of the chart at both sides of the center of the chart in a direction that is horizontal to the center of the chart,
- wherein the deviation angle is calculated using first angle-of-view information obtained by halving the angle of view when a number of end portions of the chart detected in the one or more images of the chart is one or less, and
- wherein the deviation angle is calculated using second angle-of-view information obtained by approximation using a distance from the center of the chart to the two ends of the angle of view and a distance from the center of the chart to the two end portions of the chart when the number of end portions of the chart detected in the one or more images of the chart is two and neither one of the two ends of the angle of view is located within the chart.

12. The control method according to claim 8, further comprising:
- displaying third information indicating that a distance from the image capture apparatus to the appropriate distance has fallen below the predetermined distance threshold.

13. The control method according to claim 8, wherein
- the directly facing positional relationship is a state in which an angle between a line connecting the optical center of the image capture apparatus and the center of the chart and a normal line extending from the center of the chart, and a distance between the optical center of the image capture apparatus and the normal line, have each fallen below a respective predetermined determination threshold.

14. A control method for an image capture apparatus, the control method comprising:
- capturing one or more images of a chart for correcting distortion of a lens;
- calculating a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus;
- calculating a deviation distance indicating a distance of deviation from the directly facing positional relationship based on the deviation angle and the first distance information;
- calculating an appropriate distance between the chart and the image capture apparatus in the directly facing positional relationship based on the angle-of-view information and a size of the chart;
- performing control to display information based on the deviation angle and the deviation distance so that the directly facing positional relationship is established, and display information regarding the appropriate distance in a case in which the deviation distance and the deviation angle have each fallen below a respective predetermined threshold;

until two end portions of the chart are detected in at least one of the one or more images of the chart, displaying first information indicating to a user that the image capture apparatus is to be moved so that the two end portions of the chart are located within the angle of view of the image capture apparatus is displayed; and displaying the information based on the deviation angle and the deviation distance so that the directly facing positional relationship is established until the deviation angle and the deviation distance each fall below the respective predetermined threshold.

15. A non-transitory computer-readable storage medium storing a program for causing a processor to execute a control method for an image capture apparatus, the control method comprising:

capturing one or more images of a chart for correcting distortion of a lens;

calculating a deviation angle indicating an angle of deviation of the image capture apparatus from a directly facing positional relationship relative to the chart based on first distance information from an optical center of the image capture apparatus to a center of the chart, second distance information from the optical center of the image capture apparatus to an end portion of the chart, and angle-of-view information of the image capture apparatus;

calculating a deviation distance indicating a distance of deviation from the directly facing positional relationship based on the deviation angle and the first distance information;

calculating an appropriate distance between the chart and the image capture apparatus in the directly facing positional relationship based on the angle-of-view information and a size of the chart;

performing control to display information based on the deviation angle and the deviation distance so that the directly facing positional relationship is established, and display information regarding the appropriate distance in a case in which the deviation distance and the deviation angle have each fallen below a predetermined determination threshold;

until a distance between the center of the chart and a respective center of one of the one or more images of the chart falls below a predetermined distance threshold in the directly facing positional relationship, performing control to display second information indicating to a user that the image capture apparatus is to be moved toward the center of the chart; and performing control to display the information regarding the appropriate distance in a case in which the distance between the center of the chart and the respective center of one of the one or more images falls below the predetermined distance threshold.

\* \* \* \* \*